Figure 3:
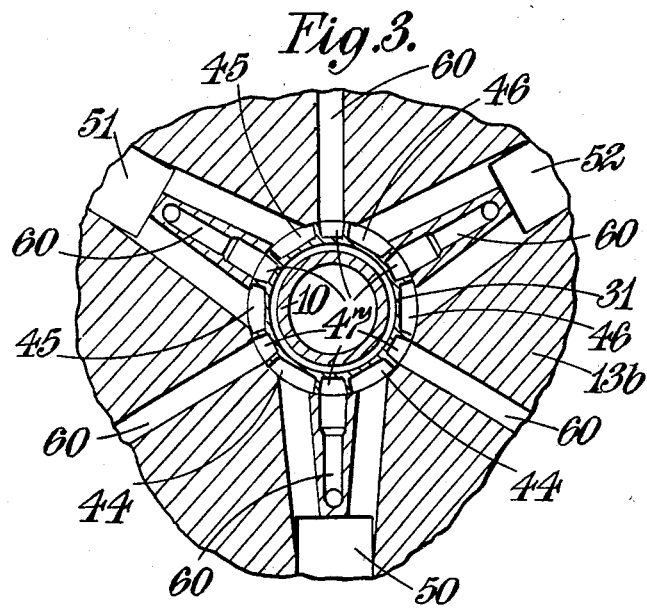

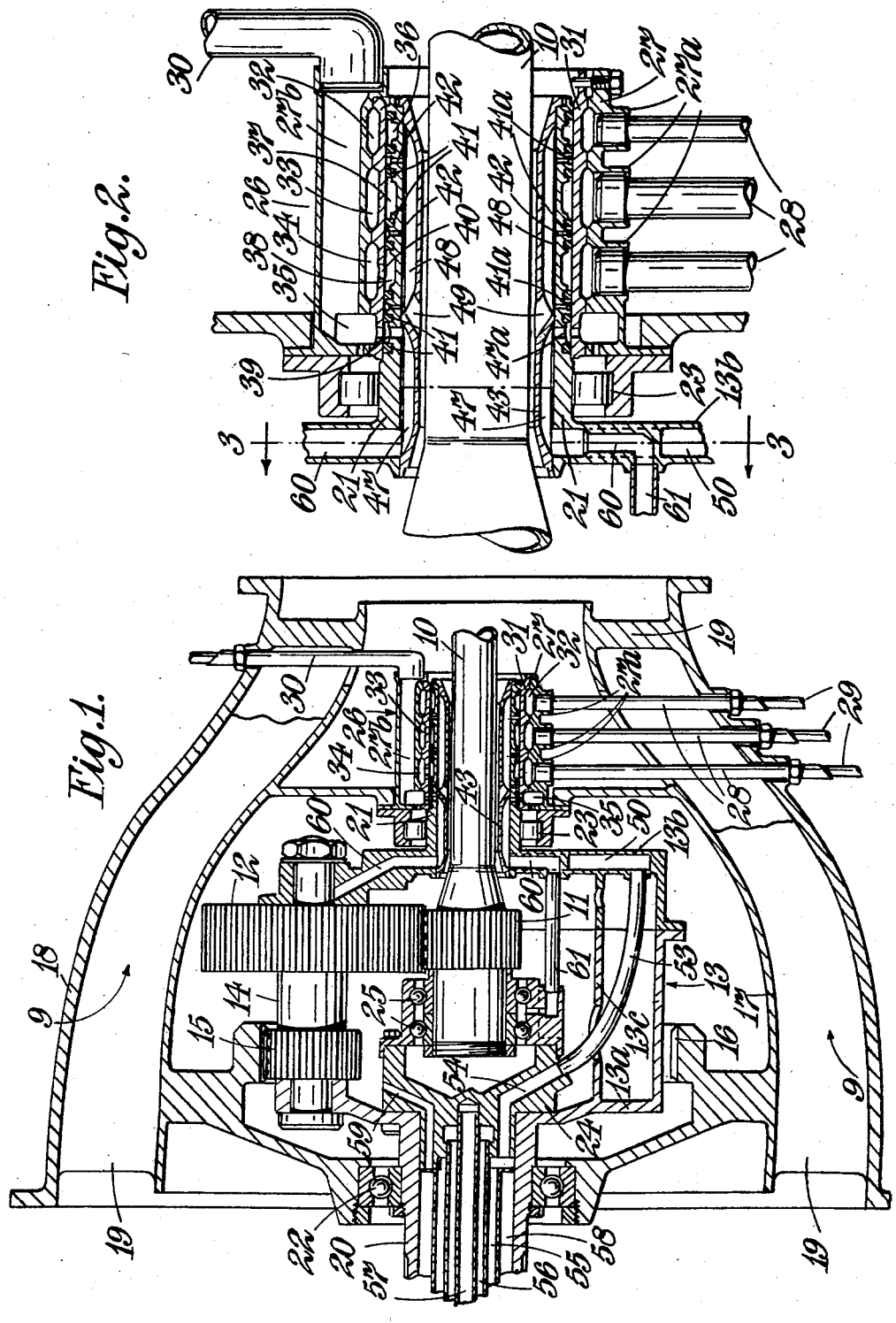

United States Patent Office 2,928,474
Patented Mar. 15, 1960

2,928,474

SUPPLYING PRESSURE OIL TO PITCH CHANGE MECHANISM OF AIR-SCREW DRIVEN BY GAS-TURBINE ENGINE

Lionel Haworth, Littleover, and Jack Palfreyman, Tansley, near Matlock, England, assignors to Rolls-Royce Limited, Derby, England, a British company Application July 8, 1957, Serial No. 670,521

Claims priority, application Great Britain July 17, 1956

8 Claims. (Cl. 170—135.75)

This invention comprises improvements in or relating to airscrew-driving gas-turbine engines. Such an engine has a driving shaft which is connected to the airscrew shaft through a reduction gear located between the gas-turbine engine and the airscrew, and the engine air-intake is usually annular and has its inner boundary formed by appropriately shaping the casing of the reduction gear.

In practice, all gas-turbine-driven airscrews are of the variable-pitch kind, and, when the pitch-change mechanism which is housed in the airscrew hub is hydraulically operated, the pressure liquid is conveyed to the pitch-change mechanism through the airscrew shaft from a supply muff encircling the airscrew shaft. The pressure oil is fed from the muff into ducts in the shaft through transverse drillings in the shaft wall. Since often a number of liquid supplies at different pressures are required, a corresponding number of transverse drillings must be made through the airscrew shaft and this gives rise to a number of disadvantages which it is the object of this invention to avoid. Firstly, the airscrew shaft under high power conditions carries a high torque and the transverse drillings in the shaft lead to stress concentrations and thus to an increase in the possibility of shaft failure. Secondly, since the airscrew shaft has a high torque loading, it is of substantial external diameter, which makes it difficult to avoid substantial oil leakage between the stationary muff and the rotating shaft. Thirdly, since the muff is between the reduction gear and the airscrew, the overall length of the engine has to be increased sufficiently to accommodate the muff.

According to the present invention, in an airscrew-driving gas-turbine engine of which the airscrew has an hydraulic pitch-change mechanism in its hub, the airscrew shaft is connected with the engine shaft through an epicyclic reduction gear whereof the planet carrier is secured to rotate with the airscrew shaft, the planet carrier has a tail shaft projecting from it towards the engine, the tail shaft carrying no substantial torque and encircling the engine shaft, and there is provided means to supply pressure oil to the pitch-change mechanism comprising a stationary muff closely surrounding the tail shaft and feeding pressure oil to ducts in the tail shaft, an oil distributor member mounted in the planet carrier at its connection with the airscrew shaft and having ducts connected with supply ducting in the airscrew shaft, and oil transfer ducts and pipes within the planet carrier interconnecting the ducts in the tail shaft and the ducts in the distributor member.

The muff is preferably also employed for the supply of lubricating oil to the bearings of the planet gears and other bearings within the planet carrier.

It will be appreciated that since the tail shaft carries no substantial torque and the engine shaft, which the tail shaft encircles, carries a low torque as compared with the airscrew shaft, the tail shaft and engine shaft may be of a substantially smaller diameter than the airscrew shaft. Thus oil leakage can be markedly reduced as compared with known arrangements. Also since the tail shaft carries no substantial torque, the possibility of high stress loadings in the shaft due to transverse drillings in it is avoided. Again since the muff is between the reduction gear and the engine it may be accommodated without increasing the length of the engine.

According to a preferred feature of this invention, the tail shaft is formed externally with a number of axially-spaced peripheral grooves corresponding to the number of pressure oil supplies required, which grooves are closed by the muff and are fed with pressure oil through appropriately spaced ports in the muff, and the tail shaft is fitted internally with a sleeve having axial channels in its external surface, each channel communicating by a drilling through the tail shaft with one of the peripheral grooves and also communicating with the appropriate transfer duct or pipe in the planet carrier.

Figure 4:
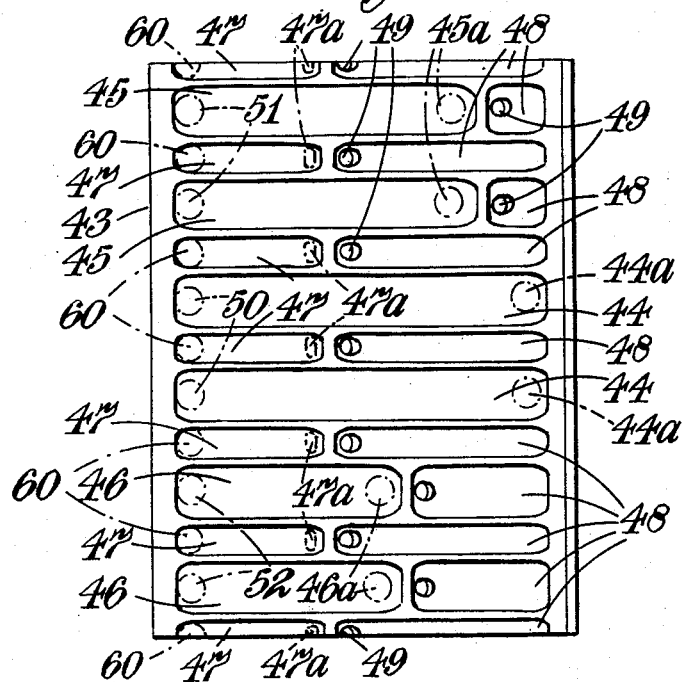
Figure 5:
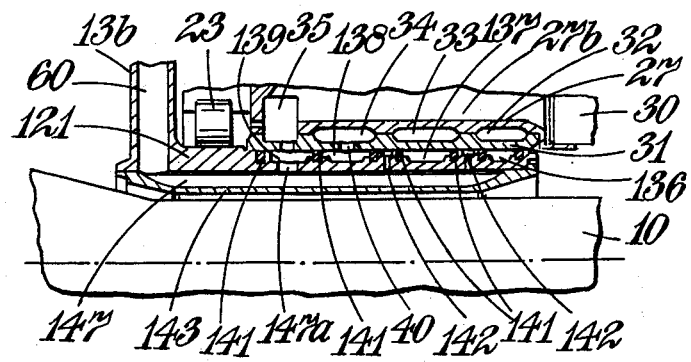
Figure 6:
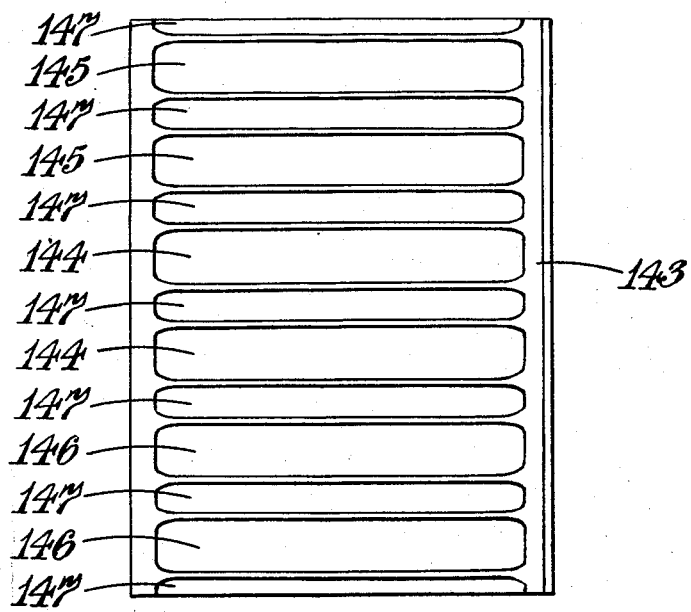

Two arrangements according to this invention will now be described with reference to the accompanying drawings in which:

Figure 1 illustrates in axial section a reduction gear between a drive shaft of a gas-turbine engine and an airscrew shaft, and pressure oil supply means for a pitch-change mechanism of the airscrew, Figure 2 illustrates part of Figure 1 to a larger scale, Figure 3 is a section on the line 3—3 of Figure 2, Figure 4 is a developed view of a part of Figures 2 and 3, Figure 5 corresponds to Figure 2 and illustrates a second arrangement, and Figure 6 is a developed view of part of Figure 5.

In Figure 1 the drive shaft 10 of the engine carries a sun gear 11 of an epicyclic reduction gear and the sun gear 11 meshes with one wheel 12 of each of three compound planet gear elements. Only one of the planet gear elements is shown, the planet gear element being equi-angularly disposed about the sun gear 11. Each planet gear element has its wheel 12 secured on a corresponding spindle 14 which is journalled in a planet carrier 13, and comprises also a second pinion 15 secured on the spindle 14. The pinions 15 mesh with an internally toothed annular gear 16 mounted against rotation within a reduction gear casing 17 which is shaped externally to afford the inner wall of an annular air intake passage 9 leading to the gas-turbine engine. The gear casing 17 is connected to the outer wall 18 of the annular air intake passage 9 by means of a number of struts 19 extending across the passage.

The planet carrier 13 is shown as being formed in two parts 13a, 13b of which the part 13a is shown as being in one piece with the airscrew shaft 20 and of which the part 13b is shown having in one with it a tail shaft 21 which projects from the planet carrier towards the engine and encircles the engine shaft 10.

The airscrew shaft 20 is mounted in the reduction gear casing 17 by means of a ball thrust bearing 22 and the tail shaft 21 is mounted in the reduction gear casing 17 by means of a journal roller bearing 23. The airscrew shaft 20 is hollow and has a plug member 24 fitted in its end which is connected to the planet carrier part 13a, and the plug member 24 carries a bearing 25 for the end of the engine shaft 10.

The following arrangement (details of which are shown in Figures 2 to 4) is employed to supply pressure oil to the pitch-change mechanism of an airscrew driven by the shaft 20. The airscrew is not illustrated and is of conventional kind having an hydraulic pitch-change mechanism accommodated in its hub.

The arrangement comprises a muff structure 26 mounted within the rear portion of the reduction gear casing 17 to encircle the tail shaft 21, the muff structure including means to transfer a number of supplies of pressure oil to ducts in the tail shaft 21, transfer ducts and piping for conveying the oil supplies from the tail shaft to the plug member 24 which is adapted as a distributor for the oil supplies, and a plurality of oil supply pipes within the airscrew shaft 20 leading to the pitch-change mechanism.

The muff structure 26 (Figure 2) comprises an outer casing 27 of cylindrical form having on its internal surface a series of four circumferential grooves and having on its outer surface three unions 27a to which are connected oil supply pipes 28 extending outwardly through one of the struts 19 (Figure 1) to external supply connections 29. The oil fed through the pipes 28 can flow into the grooves on the internal surface of the casing 27. The outer casing also has a fourth pipe connection 30 extending through one of the struts 19 to convey oil to a duct 27b (Figure 2) within a swelling on the casing 27, which duct 27b opens into the fourth groove. The muff structure 26 also comprises a liner 31 fitted within the casing, the liner having external circumferential grooves corresponding in axial position to the grooves in the casing 27. When the liner 31 is fitted in the casing 27 with the grooves in register, four oil supply manifolds 32, 33, 34, 35 are formed which are fed with oil under pressure respectively by the three pipes 29 and the pipe 30.

The liner 31 of the muff structure has a running clearance on the tail shaft 21 which is provided externally with a series of four circumferential grooves 36, 37, 38 and 39 which are axially level with the manifolds 32, 33, 34 and 35 respectively and are connected to them by ports 40 in the liner 31 to be supplied with pressure oil. The tail shaft 21 has a sealing ring 41 fitted in it on each side of each of the grooves 36, 37, 38, 39 and the sealing rings 41 co-operate with the internal surface of the liner 31 to reduce oil leakage along the tail shaft between the grooves 36, 37, 38 and 39. In this construction the tail shaft 21 is also provided between adjacent sealing rings 41 with further annular grooves 41a and with radial drillings 42 to collect any leakage oil and return it to a region of low pressure.

The tail shaft 21 has fitted within it a sleeve 43, of which an external developed view is shown in Figure 4, and this sleeve has in its external surface a series of longitudinal channels. Some of the channels, indicated by reference 44, extend axially through the whole length of the sleeve 43 and are placed in communication with the groove 36 by drillings 44a through the tail shaft 21 so that the channels 44 are fed with pressure oil from the manifold 32. Other channels, indicated at 45, are placed in communication with the groove 37 by drillings 45a in the tail shaft to be fed with pressure oil from the manifold 33. Still further channels 46 are placed in communication with the groove 38 by further drillings 46a in the tail shaft, and further channels 47 are placed by drillings 47a through the tail shaft into communication with the groove 39. The remaining channels 48, receive leakage oil through the drillings 42 and the oil flowing into the channels 48 drains through ports 49 in the sleeve 43 to the space between the engine shaft 10 and the sleeve 43. It will be appreciated that the drillings 44a, 45a, 46a connecting the channels 44, 45 and 46 with the grooves 36, 37 and 38 respectively are not shown in Figure 2 of the drawings, since they are at positions angularly offset from the plane of section in Figure 2, but their axial positions are indicated in Figure 4.

The channels 44, 45 and 46 at their ends adjacent the reduction gear communicate with the radially inner ends of respective drillings 50, 51 and 52 (see Figures 2 and 3) in the part 13b of the planet carrier 13 and these drillings are connected at their radially outer ends (as shown for the drillings 50 in Figure 1) by oil transfer pipes 53 to respective ducts 54 in the distributor member 24. The airscrew shaft 20 has arranged coaxially within it an appropriate number of oil supply pipes 55, 56, 57 and the ducts 54 corresponding to the three supplies from the manifolds 32, 33, 34 are connected respectively to open into the oil supply pipes 55, 56 and 57, so to deliver the supplies of oil from the manifolds separately to the pitch-change mechanism. The space 58 between the outer oil supply pipe 55 and the airscrew shaft 20 is employed as a return oil duct and this space opens via a duct 59 in the distributor member 24 into the reduction gear casing.

The transfer pipes 53 may be protected from damage, say, due to fracture of a tooth of one of the gear elements by arranging that reinforcing webs 13c forming part of the planet carrier 13 lie between the transfer pipes 53 and the gear elements. Also to avoid possibility of fracture of the transfer pipes 53 due to vibration, the ends of the transfer pipes may be mounted in rubber bushings.

The ends of the channels 47 nearer the reduction gear open to further drillings 60 in the part 13b of the planet carrier 13 and oil is conveyed through the drillings 60 and if necessary through further transfer pipes 61 to lubricate the bearings of the spindles 14 of the planet gear elements and the bearing 25 for the end of the shaft 10. The pipe 61 may be protected against damage or fracture due to vibration in the manner described for the transfer pipes 53.

In a modification of the oil supply arrangement above described, any oil leaking from the grooves 36, 37, 38 is allowed to flow into the channels conveying bearing lubricating oil.

Such a construction is shown in Figures 5 and 6 in which parts which are the same as those of Figures 1 to 4, are indicated by the same references.

As in the construction of Figures 1 to 4, the part 13b of the planet carrier has a tail shaft 121 encircling the engine shaft 10 and the tail shaft is encircled by a stationary muff structure comprising casing 27 and liner 31 together affording supply manifolds 32, 33, 34, 35. The tail shaft 121 has a running clearance from the liner 31 and has in its external surface a series of four peripheral grooves 136, 137, 138, 139 receiving pressure oil from the manifolds 32, 33, 34, 35 respectively. Sealing rings 141 are provided between the tail shaft 121 and the liner 31, three pairs of sealing rings between grooves 136 and 137, and 137 and 138, a single ring between grooves 138 and 139, and single rings at the sides of grooves 136 and 139 remote from the other grooves. Groove 139 is connected by a drilling 147a with axial channels 147 in a sleeve 143 and oil leaking from the grooves 136, 137, 138 to between the pair of sealing rings 141 also flows into the channels 147 through drillings 142. The oil supplies from the grooves 136, 137, 138 flow through ports in the tail shaft into channels 144, 145, 146 respectively, all of which channels extend throughout the length of the sleeve 143. As in the construction of Figures 1 to 4, the oil leaves the channels 144, 145, 146, 147 into drillings in the part 13b of the planet carrier in the same way as shown in Figure 3. With this arrangement the form of the sleeve 143 is simplified.

It will be appreciated that the arrangements above described have a number of advantages as compared with the known arrangement, in which pressure oil supplies are fed to the airscrew shaft 20 through a muff structure encircling the rear end of the shaft 20.

Firstly, the shaft 20 is subject to high torque loadings, whereas the tail shaft 21 or 121 carries no substantial torque and thus the provision of transverse drillings in the tail shaft does not give rise to high stress concentrations and to the possibility of failure due to such stress concentrations.

Secondly, it is possible to reduce oil leakage at the point of transfer from stationary structure to rotating structure, since the diameters of the shafts 10, 21 and 121 can in general be made substantially smaller than the diameter of the airscrew shaft 20; this is because the shaft 21 carries no substantial torque loads and the shaft 10 has substantially lower torque loadings in operation than the airscrew shaft 20. It will also be clear that as the maximum torque required to be transmitted in the shaft 20 increases so its diameter must be increased.

Thirdly, since the muff structure 26 is arranged between the reduction gear and the engine, it can be accommodated within space which must be provided due to the necessary shaping of the inner wall 17 of the air intake duct 9 and which may otherwise be unoccupied, so that the overall length of the engine and airscrew may be decreased as compared with the known arrangement where the muff structure is between the reduction gear and the airscrew.

Also, by providing webs, such as webs 13c, as part of the planet carrier so as to protect the oil transfer pipes 53 against damage in the event of disruption of the gearing, the pilot may still retain control of the airscrew.

The arrangement of this invention may also permit a reduction in the length of pipes employed for conveying the pressure oil supplies between the oil pumps and the muff structure since it is usual in aircraft gas-turbine propeller engines to arrange the oil pumps close to the rear end of the reduction gear, where the overall diameter of the engine is low, thereby to avoid unnecessarily increasing the frontal area of the engine and its auxiliaries.

We claim:

1. An airscrew-driving gas-turbine engine of the class comprising an airscrew having a hub and a hydraulic pitch-change mechanism in its hub; an engine shaft, an airscrew shaft and an epicyclic reduction gear drivingly connecting the engine shaft and airscrew shaft, said reduction gear including a sun gear secured on the engine shaft, planet gears meshing with the sun gear, a planet gear carrier in which the planet gears are journalled, and a relatively-stationary annulus gear meshing with the planet gears and providing the torque reaction member of the reduction gear; said planet carrier of the reduction gear being secured to the airscrew shaft to rotate with it; wherein the planet carrier has a tail shaft projecting from it towards the engine, the tail shaft carrying no substantial torque and encircling the engine shaft, and there is provided means to supply pressure oil to the pitch-change mechanism comprising a stationary muff closely surrounding the tail shaft and feeding pressure oil to ducts in the tail shaft, an oil distributor member mounted in the planet carrier at its connection with the airscrew shaft and having ducts connected with supply ducting in the airscrew shaft, and oil transfer ducts and pipes within the planet carrier interconnecting the ducts in the tail shaft and the ducts in the distributor member.

2. An airscrew-driving gas-turbine engine as claimed in claim 1, wherein the muff is also employed for the supply of lubricating oil to the bearings of the planet gears and other bearings within the planet carrier.

3. An airscrew-driving gas-turbine engine as claimed in claim 1, wherein the tail shaft is formed externally with a number of axially-spaced peripheral grooves corresponding to the number of pressure oil supplies required, which grooves are closed by the muff and are fed with pressure oil through appropriately spaced ports in the muff, and there is provided a sleeve fitted internally in the tail shaft, the sleeve having axial channels in its external surface, each channel communicating by a drilling through the tail shaft with one of the peripheral grooves and also communicating with the appropriate transfer duct or pipe in the planet carrier.

4. An airscrew-driving gas-turbine engine as claimed in claim 3, comprising sealing rings mounted in the tail shaft at each side of each groove and co-operating with the muff to limit leakage of oil from the grooves axially of the tail shaft, at least some of the grooves being separated by pairs of sealing rings and the spaces between the pairs of sealing rings being in communication with some of the channels in the sleeve.

5. An airscrew-driving gas-turbine engine as claimed in claim 4, wherein the channels in the sleeve with which said spaces communicate, have outlets therefrom into a casing for the reduction gear.

6. An airscrew-driving gas-turbine engine as claimed in claim 4, wherein the channels in the sleeve with which said spaces communicate, also communicate with one of the peripheral grooves in the tail shaft, and said one of the peripheral grooves is supplied with oil under pressure for bearing lubricating purposes.

7. An airscrew-driving gas-turbine engine according to claim 3, wherein the muff comprises a cylindrical casing having internally a series of axially-spaced circumferential grooves, and a liner fitted within the casing and formed externally with a corresponding series of external circumferential grooves registering with the grooves in the casing to form a series of oil supply manifolds, there being individual supply connections to the manifolds, and the grooves in the tail shaft having an axial spacing corresponding to the spacing of the manifolds and communicating with the grooves.

8. An airscrew-driving gas-turbine engine according to claim 1, wherein the planet carrier comprises webs extending between the oil transfer pipes and the gear elements of the reduction to protect them against damage.

References Cited in the file of this patent

UNITED STATES PATENTS

| | | |
|---|---|---|
| 2,307,578 | Fedden | Jan. 5, 1943 |
| 2,308,228 | Matteucci | Jan. 12, 1943 |
| 2,433,990 | Hardy | Jan. 6, 1948 |
| 2,661,807 | Fielding | Dec. 8, 1953 |
| 2,754,923 | Strandell | July 17, 1956 |
| 2,786,539 | Nichols | Mar. 26, 1957 |